United States Patent Office 3,145,274
Patented Aug. 18, 1964

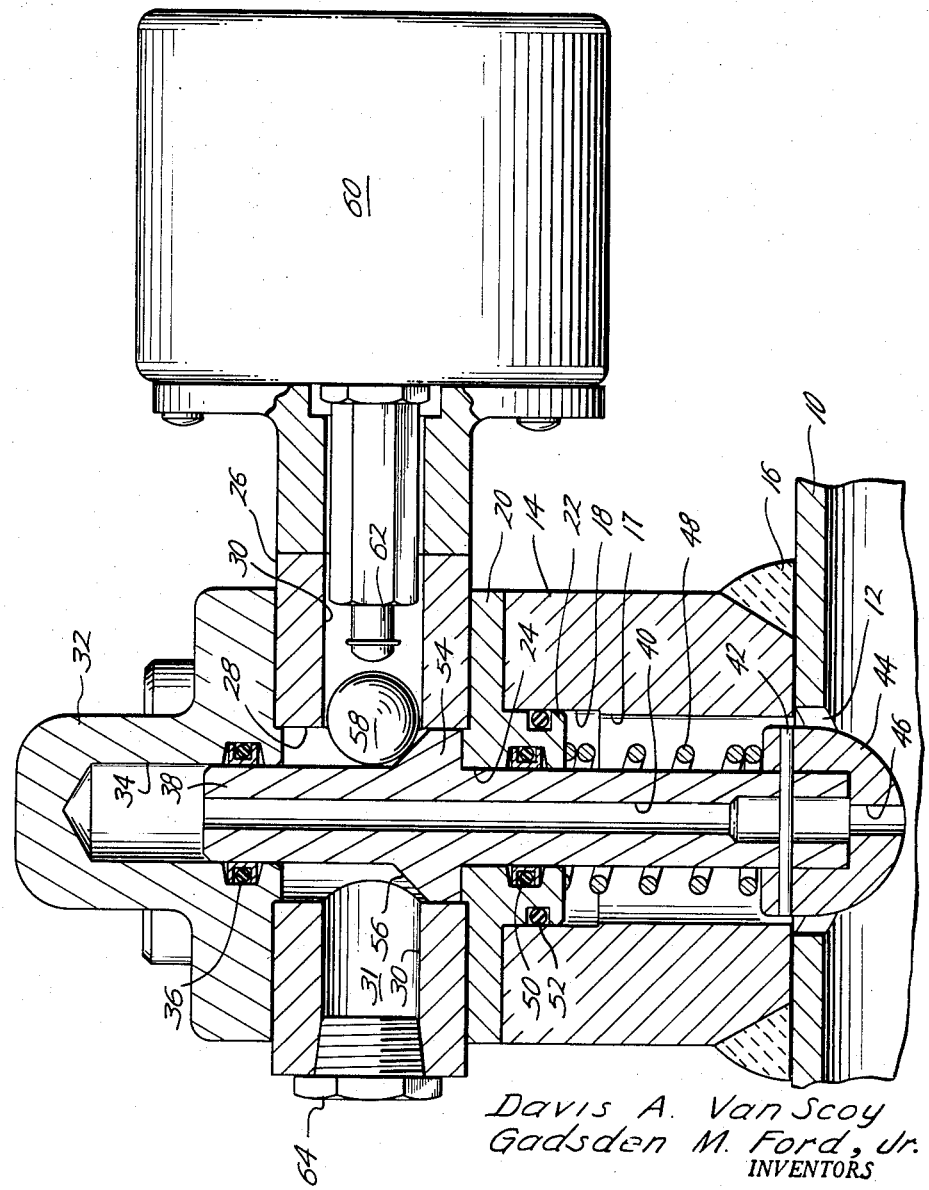

3,145,274
PIPELINE PIG DETECTOR
Davis A. Van Scoy and Gadsden M. Ford, Jr., Houston, Tex., assignors to F. H. Maloney Company, a corporation of Texas
Filed Mar. 28, 1961, Ser. No. 98,889
10 Claims. (Cl. 200—61.41)

This invention relates to new and improved pipeline pig detectors and more specifically to the improved devices for detecting, indicating and responding to the passage of solid objects through a pipe line, such as are used to indicate when such an object has passed a certain predetermined point in the line and as are used to operate other apparatus in response to such passage.

In the operation of long pipelines, as for example gas transmission lines, crude oil lines, and oil product lines, it is often found necessary or desirable to pass a solid object through the line for various purposes. In petroleum product lines movable barriers in the line prevent excessive intermixing between sequential different liquids in the line. Scrapers are pumped through lines to clean out accumulated scale and sand deposits. Other devices are passed through the line to measure the rate or volume of flow through the line and still others are used for removing condensed liquids from natural gas lines. Recently a rubber or synthetic rubber sphere has been found to be satisfactory for many of these purposes. Devices as are used for such purposes are broadly known in the art as "pigs" and this term will be used herein to describe any solid device or object which may be moved through a pipeline and carried with the flow of fluid therethrough.

It is apparent that in all these applications of spheres and other devices it is often necessary to know when the device has reached certain points in the line. In many instances it is desirable to have other equipment operated in response to the arrival of the pig at such a point. In other instances it is necessary to operate a signaling device or an alarm when the pig reaches a certain point in the line. Sometimes it is desirable to operate two or more auxiliary signal generating devices in response to the passage of the pig.

Pipeline signaling devices adapted to respond to the passage of a pig through the pipeline have previously been limited in their applications because they normally are adapted to actuate no more than one auxiliary device. A principal defect in the signaling devices heretofore known has been that the devices are subject to rapid wear because of the high pressure exerted against moving parts which causes a relatively heavy load on bearings within the devices. Another disadvantage of the signaling devices previously used is that they require a relatively large aperture in the side of the pipeline through which a trigger extends. Such a large aperture is particularly undesirable in applications where the pig is used for checking the flow through the line since when the pig reaches the aperture, fluid by-passes the pig and therefore an erroneous reading is obtained. Similarly, when pigs are used to separate sequential different liquids in a line, liquid by-passing at the aperture will greatly increase the intermixing of the different liquids.

According to the present invention a pipeline signaling device is provided wherein only a very small opening is required through the pipeline so that substantially no fluid by-pass occurs around the pig when it passes the opening for the signaling device. In addition the signaling device of this invention provides means for actuating two or more auxiliary devices whether such auxiliary devices are operated by air, by hydraulic pressure, by electrical means, or by other means. Furthermore the apparatus of this invention is completely pressure balanced so that no elements of the apparatus are put under heavy load due to the pressure in the pipe line to which the signaling device is attached.

For a better understanding of the invention reference is now made to the attached drawing wherein the single figure is a sectional view of a preferred embodiment of the pipeline signaling apparatus of this invention.

In the embodiment of the invention shown in the drawing the pipeline 10 is provided with an aperture 12 which is circular. A detector body 14 is attached to the pipeline as by weld 16 and is provided with an axial bore 17 extending therethrough. The body is attached to the pipeline in such a position that the bore 17 is in alignment with aperture 12 in the pipeline. Bore 17 is counterbored at 18. A seal retainer flange 20 is positioned on top of the body 14 and is provided with a central hub 22 which extends into counterbore 18 in close fitting relationship therewith. Seal retainer flange 20 is also provided with an axial bore 24 extending therethrough. An intermediate support ring 26 is provided for supporting various apparatus to be actuated by the signaling apparatus in a manner as will be described hereinafter. The intermediate support ring is provided with an axial bore 28 and is positioned on seal retainer flange 20 so that bore 28 is in alignment with bore 24 of flange 20. Support ring 26 is also provided with a plurality of radial bores 30, 31 which intersect axial bore 28. A cap 32 fits over the support ring 26 and and is provided with an axial hole 34 extending from its base adjoining the support ring partially through the cap. Body 14, intermediate ring 26, and cap 32 comprise a housing for the detector of this invention. Annular sealing means 36 circumscribe the interior of hole 34 and provide a sealing engagement of cap 32 with a detector plunger 38. Detector plunger 38 extends through bore 17 in body 14, through bore 24 in retainer flange 20, through bore 28 in support ring 26 and into hole 34 in cap 32. In its normal position the end of the detector plunger within the cap does not extend to the bottom of hole 34. Detector plunger 38 has an axial bore 40 extending therethrough. Attached to the lower end of the plunger 38 as by means of a pin 42 is a trigger 44. Trigger 44 in the normal position of the detector plunger extends through the aperture 12 in the pipeline and into the interior of the pipeline. Trigger 44 also has an axial bore 46 which is in communication with the bore 40 in plunger 38. A spring 48 is positioned between trigger 44 and the hub 22 of retainer flange 20 thereby resiliently urging the trigger 44 toward its position within the interior of the pipeline i.e. the normal position. If the detector is installed vertically, the spring is needed only to overcome the friction of the sealing elements, since passageway 40 provides means for equalizing fluid pressure on both ends of plunger 38.

Annular sealing means 50 are provided on the interior of hub 22 of retainer flange 20 for sealing engagement of the retainer flange with the plunger 38. Annular sealing means 52 are also provided on the exterior of hub 22 to provide a sealing engagement of hub 22 with counterbore 18.

Detector plunger 38 is provided intermediate its ends with a flange 54 which in the normal position of the plunger is resiliently retained adjacent the top of seal retainer flange 20 by means of spring 48. Flange 54 is bevelled at 56 on its upper side for engagement with a ball 58 which is positioned in a radial bore 30 and is movable axially thereof.

In the embodiment shown in the drawing, a Microswitch 60 is attached to the apparatus of this invention in such a manner as to have its spring-biased actuating arm 62 extending into and axially of radial bore 30.

It will be apparent that when a pig passes through pipeline 10, it will contact trigger 44 and cause it to move upwardly against the urging of spring 48. Since trigger 44 is affixed to detector plunger 38, the plunger also moves upwardly, whereby the bevel 56 on flange 54 causes ball 58 to move radially outwardly into contact with actuating arm 62 of the Microswitch 60, and thereby actuate the Microswitch, which in turn may be connected to a valve, a recorder, a signal, or other apparatus, as may be desired by the operator.

Radial bore 31 is shown in the drawing to be closed by a plug 64. It will be apparent, however, that another Microswitch, or other device may be attached here, and another ball 58 provided, so that another signal generating device may also be actuated by the same movement of the trigger 46. The number of devices which may be actuated is limited only by the physical dimensions of the detector.

It will be noted that the apparatus of this invention may be used with only a small aperture in the pipeline. This is made possible by virtue of the trigger having only longitudinal movement, and not swinging movement, as have the triggers of detectors previously used. Trigger 44 is formed in a shape which adapts the trigger to be moved in a direction transversely of the direction of movement of the pig through the pipeline, a hemispherical shape being used in the embodiment shown.

Many modifications of this invention will be apparent to those skilled in the art, therefore this invention is not limited to the specific embodiment shown and described, but only as set forth by the following claims.

We claim:

1. Apparatus for detecting the passage of a pipeline pig which comprises a housing adapted to be attached to a pipeline; an axial bore in said housing which terminates short of the end of the housing opposite the end adapted to be attached to a pipeline; a longitudinally movable plunger sealingly engaged within said bore having a normal position in which one end of said plunger extends out of said housing and into the interior of said pipeline when said housing is attached to said pipeline, and having an actuated position in which said one end of said plunger is substantially within said housing and does not extend into the interior of said pipeline when said housing is attached to said pipeline; means biasing said plunger toward said normal position; an axial passageway extending all the way through said plunger, whereby fluid pressure from said pipeline is applied to both ends of said plunger; at least one radial bore in said body intersecting said axial bore; a ball in said radial bore; and means on said plunger adapted to contact said ball and move it radially outwardly upon movement of said plunger from said normal position to said actuated position.

2. Apparatus as defined by claim 1 wherein said means for moving said ball radially outwardly comprises a bevelled flange on said plunger.

3. Apparatus for detecting the passage of a pipeline pig which comprises a housing, an axial bore in said housing terminating short of the end of the housing at one end, at least one radial bore in said housing intersecting said axial bore intermediate the ends of said axial bore, a longitudinally slidable plunger in said axial bore having an end adapted to be moved out of the end of the axial bore, means communicating fluid pressure between the ends of the plunger, seal means around said plunger adapted to prevent communication of such fluid pressure to the radial bore, radially movable means in said radial bore, and means on said plunger adapted to cause radial movement of said radially movable means upon longitudinal movement of said plunger.

4. Apparatus as defined by claim 3 wherein there are a plurality of said radial bores, and a radially movable means in each of said radial bores.

5. Apparatus as defined by claim 4 and including signal generating means attached to said housing adjacent each said radial bore, and an actuating arm on each said signal generating means extending into its respective radial bore, whereby each signal generating means is operable to generate a signal in response to longitudinal movement of the plunger.

6. Apparatus for detecting the passage of a pipeline pig which comprises a housing adapted to be attached to a pipeline, a longitudinally slidable plunger in said housing adapted to be moved by the passage of a pig through the pipeline from a first position in which a portion of the plunger extends into an aperture in said pipeline to a second position in which no portion of the plunger extends into said aperture, means equalizing the pressures exerted on the ends of said plunger, actuating means on said plunger adapted to cause actuation of a signal generating device upon movement of said plunger to said second position, and means in said housing for preventing communication of fluid pressures between either end of said plunger and said actuating means.

7. Apparatus for detecting the passage of a body through a pipeline carrying fluid under pressure which comprises a housing having an open end adapted to be attached to said pipeline to communicate said open end to the fluid pressure in said pipeline, a longitudinally slidable plunger in said housing having a first position in which one end of said plunger extends out said open end of said housing and a second position in which said one end is at least partially retracted, means communicating fluid pressure from said pipeline to both ends of said plunger, and means on said plunger adapted to cause actuation of a signal generating device upon movement of said plunger to said second position.

8. Apparatus for detecting the passage of a pipeline pig which comprises a housing adaped to be attached to a pipeline, a longitudinally slidable plunger in said housing having a first position in which one end of said plunger extends out one end of said housing and a second position in which said one end is at least partially retracted, means communicating fluid pressure between the ends of said plunger, actuating means on said plunger adapted to cause actuation of a signal device upon movement of said plunger to said second position, and seal means in said housing for preventing communication of said fluid pressure between either end of said plunger and said actuating means.

9. Apparatus for detecting the passage of a pipeline pig which comprises a housing adapted to be attached to a pipeline containing fluid under pressure in position to surround an opening in the wall of the pipeline, a longitudinally slidable plunger in said housing having a first position in which one end of said plunger extends through said opening into said pipeline and a second position in which said one end is retracted from said pipeline, conduit means communicating fluid pressure between the ends of said plunger, actuating means on said plunger adapted to cause actuation of a signal device upon movement of said plunger to said second position, and means in said housing for preventing communication of said fluid pressure between either end of said plunger and said actuating means.

10. Apparatus as defined by claim 8 wherein said conduit means comprises a longitudinal passageway through said plunger.

References Cited in the file of this patent

UNITED STATES PATENTS

| | | |
|---|---|---|
| 2,667,631 | Schaurte | Jan. 26, 1954 |
| 2,698,363 | Rush | Dec. 28, 1954 |
| 3,011,196 | Glover | Dec. 5, 1961 |